United States Patent [19]

Dye et al.

[11] 4,121,260
[45] Oct. 17, 1978

[54] TRANSCEIVER SYSTEM FOR VISIBLE IMAGES

[75] Inventors: Malcolm Stuart Dye, Biggleswade; Michael James Redman, Datchworth; David W. Satchell, Welwyn Garden City, all of England

[73] Assignee: Xerox Corporation, Stamford, Conn.

[21] Appl. No.: 784,490

[22] Filed: Apr. 4, 1977

[30] Foreign Application Priority Data

Oct. 14, 1976 [GB] United Kingdom ............... 42635/76

[51] Int. Cl.² ........................ H04N 1/02; H04N 1/12; H04N 1/24
[52] U.S. Cl. .................................. 358/295; 346/150; 346/165; 358/286; 358/300
[58] Field of Search ................ 346/150, 165; 358/295, 358/300, 286

[56] References Cited

U.S. PATENT DOCUMENTS

| | | | |
|---|---|---|---|
| 3,769,629 | 10/1973 | Sambucetti | 346/165 |
| 3,943,528 | 3/1976 | Camphausen | 346/165 |

Primary Examiner—Howard W. Britton

[57] ABSTRACT

A transceiver system is provided which selectively applies electrical potentials representative of graphical information to a stylus scanning a layer of electrochromic material thereby causing selective coloration of the materials.

4 Claims, 3 Drawing Figures

TRANSCEIVER SYSTEM FOR VISIBLE IMAGES

BACKGROUND OF THE INVENTION

This invention relates to a transceiver system for visible images, the visible images being produced by the selective application of electrical potentials to an imaging material. A material in which visible images may be formed by chemically-produced color changes as a result of the selective use of electrical potentials, is hereinafter called an electrochromic material. With many electrochromic materials, the images are reversible, that is, they can be erased by applying a reverse potential to the imaging material.

Various imaging systems are known for reversibly forming visible images in this way. In one such system, a liquid electrochromic material is used as an imaging medium, and a set of first electrodes co-operate with one or more counterelectrodes to cause deposition of colored material onto selected ones of the first electrodes which have electrical potentials applied to them, to form an image. Typically the first electrodes are transparent conductive members. Erasure is achieved either by the removal of the potentials and the passage of time, or by reversal of the potentials. One kind of electrode configuration which has been suggested for the first electrodes of such systems is the so-called 7-bar configuration, in which seven straight bars are arranged to form the general shape of a square-sided figure-8. By energizing selected ones of the bars, each of the numerals from 0 to 9 may be depicted.

In the concurrently filed patent application in the joint names of M. S. Dye and M. J. Redman entitled "Method and Apparatus for Forming Visible Images" U.S. Ser. No. 784,493 filed on Apr. 4, 1977, there is described and claimed a method and apparatus for forming a visible image comprising selectively applying electrical potentials across an electrochoromic material. The potentials are applied by co-operating electrode means, and the electrochromic material and at least one of the electrode means are moved relative to one another. This latter electrode means comprises a plurality of electrode elements that are individually electrically energizable.

OBJECTS AND SUMMARY OF THE INVENTION

It is an object of the present invention to provide a transceiver system for visible images, utilizing the image forming technique specified in the preceding paragraph.

According to the present invention, there is provided a transceiver system for graphical information comprising a recording sheet having at least a layer of an electrochromic material, a conductive support platen for said recording sheet, and a stylus array comprising a plurality of styli for scanning the sheet supported on the platen, the stylus array and the platen being mounted for relative movement, the system including receive means for selectively applying electrical potentials to individual ones of said styli during scanning so as to cause selective coloration of the electrochromic material in accordance with received electrical signals representing incoming graphical information, and transmit means, responsive to electrical potentials corresponding to outgoing graphical information and detected by individual ones of said styli, for transmitting electrical signals representing said outgoing graphical information.

BRIEF DESCRIPTION OF THE DRAWINGS

A transceiver system in accordance with the invention will now be described, by way of example, with reference to the accompanying drawings, in which.

DESCRIPTION OF THE PREFERRED EMBODIMENTS

Figure 1:
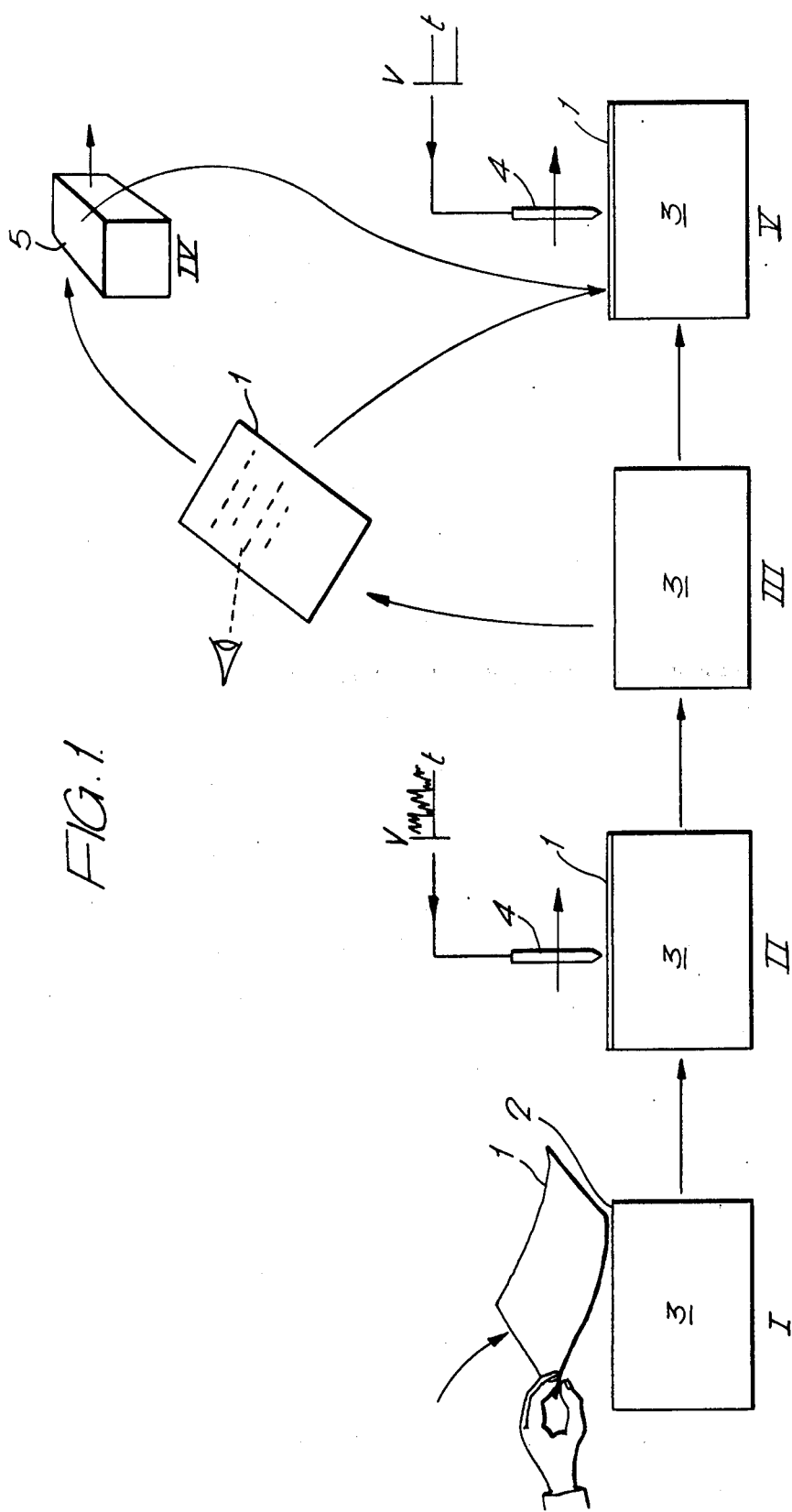
FIG. 1 is a schematic illustration of the transceiver system operating in the receive mode.

The transceiver system of the invention utilizes an electrochromic material, which material, as mentioned in the introductory part of this specification, is one which forms a visible image when electrical potentials are selectively applied across it. In practice, in order to make an image visible, it is only necessary for the material to change color; thus, if working with a white background, a material is particularly suitable if it is white or transparent in one state, but changes to some other color, preferably contrasting with white, in its other state. This electrochromic material may either be of an inorganic solid, for example a transition metal compound such as tungsten oxide, or an organic liquid or solid such as one of the viologen derivatives.

Examples of transition metal compounds used as electrochromic materials may be found in U.K. patent specification No. 1,186,541. Examples of viologen derivatives used as electrochromic materials may be found in U.S. Pat. Nos. 3,712,709 and 3,930,717, as well as in U.S. Pat. Nos. 3,806,229 and 3,854,794. Particularly suitable compounds are N(p-cyanophenyl) substituted derivatives of bi-cyclic compounds having two conjugated nitrogen-containing aromatic rings.

As described in the above mentioned patent specifications, there are many derivatives of the bipyridyl group which exhibit color changes in response to electric current flow. The N(p-cyanophenyl) compund and especially N,N' di(p-cyanophenyl) - 4,4' bipyridylium dichloride, is particularly useful in that it is reversibly electrolytically reduced on passage of a current in the appropriate direction to provide a radical which is colored, usually green, while the parent compund is colorless or pale yellow. Furthermore, in its reduced state, the material is almost completely insoluble, so that it stays on or adjacent to one of the electrodes, without displaying the tendency of some of the viologens to redissolve in the absence of a reducing current. Thus with the preferred compound, an image, once formed, tends to be stable even in the absence of any current, but will nevertheless disappear entirely under reverse current flow. It has also been found desirable to include with the electrochromic material a second reversible oxidizible material, preferably ferrous ammonium sulphate. This provides a ferrous $\gtrless$ ferric ion combination in a particulary suitable form, improving the speed of bleaching on reversing the potential. It does, however, cause a certain amount of deterioration in the memory (i.e. the stability of the image in the absence of an electric current). This memory effect can be restored by the addition of, for example, an organic acid such as tartaric acid. Further examples of such additives are given in German OLS No. 2,511,314.

The examples of viologen-type electrochromic materials discussed above are normally used in a liquid form. In an alternative configuration, they may be used in solid form, typically as a layer of polymeric based material.

Referring now to FIG. 1, a recording sheet 1 is used to record a visible image which has been transmitted from a remote location by means of coded electronic signals. The recording sheet 1 includes at least a layer of an electrochromic material which may be in liquid form, but which for convenience is preferably in solid form. The sheet may be rigid or flexible, and transparent, translucent or opaque, the preferred form being one resembling a normal sheet of paper. In order to record an image, the recording sheet 1 is placed, as shown at I in FIG. 1, on a conductive support platen 2 which may typically form the top surface of a device 3 that includes a scanning stylus array. The sheet 1 and an appropriate form of platen 2 may be in any of the forms described in our copending patent application U.S. Ser. No. 784,493. As indicated at II in FIG. 1, a stylus array 4 may be arranged to move above the sheet 1 by means of a carriage (not shown) or may alternatively be arranged to move within the device 3 so as to scan the downward-facing surface of the sheet 1. In this case, if necessary, a platen in the form of a cover (not shown) may be brought down onto the top surface of the sheet 1. As a further alternative, the sheet 1 may be moved on a moving platen past the stylus array. The stylus array 4 is a sheet-width array which typically contains between 1000 and 4000 styli or electrode elements. On receipt of a signal, the stylus array 4 and the sheet 1 are caused to move relative to one another under the control of motors so that the stylus array scans the sheet, typically in a time of the order of 1 second. As the styli ride over the sheet 1 they are driven by suitable electronic circuits with signal potentials. As already explained, this produces a visible image, usually a dark image on a white background, to correspond with an original document. This image can be read or copied, as indicated at III in FIG. 1. At the end of the scanning movement, the styli or the sheet are returned to their original position. By using a suitable electrochromic material in the sheet 1, the visible image may be a semipermanent one, i.e. one which will last for a time of the order of days. This gives time for normal use of the image as if it were an ordinary document, but if a permanent copy is required, this can be made from the sheet 1 on, for example, a xerographic copying machine 5, as indicated at IV in FIG. 1. Once the image on sheet 1 has served its useful purpose, it may be erased by replacing it on the device 3, as indicated at V in FIG. 1, and applying a steady reverse potential to all the styli in the array 4 during a scanning movement. Alternatively, the image may be permitted to fade with the passage of time.

The stylus array 4 is fed with an electrical signal from a remote transmitter, which may be of the kind to be described below, either through the telephone network, or through a suitable high-speed data link.

Figure 2:
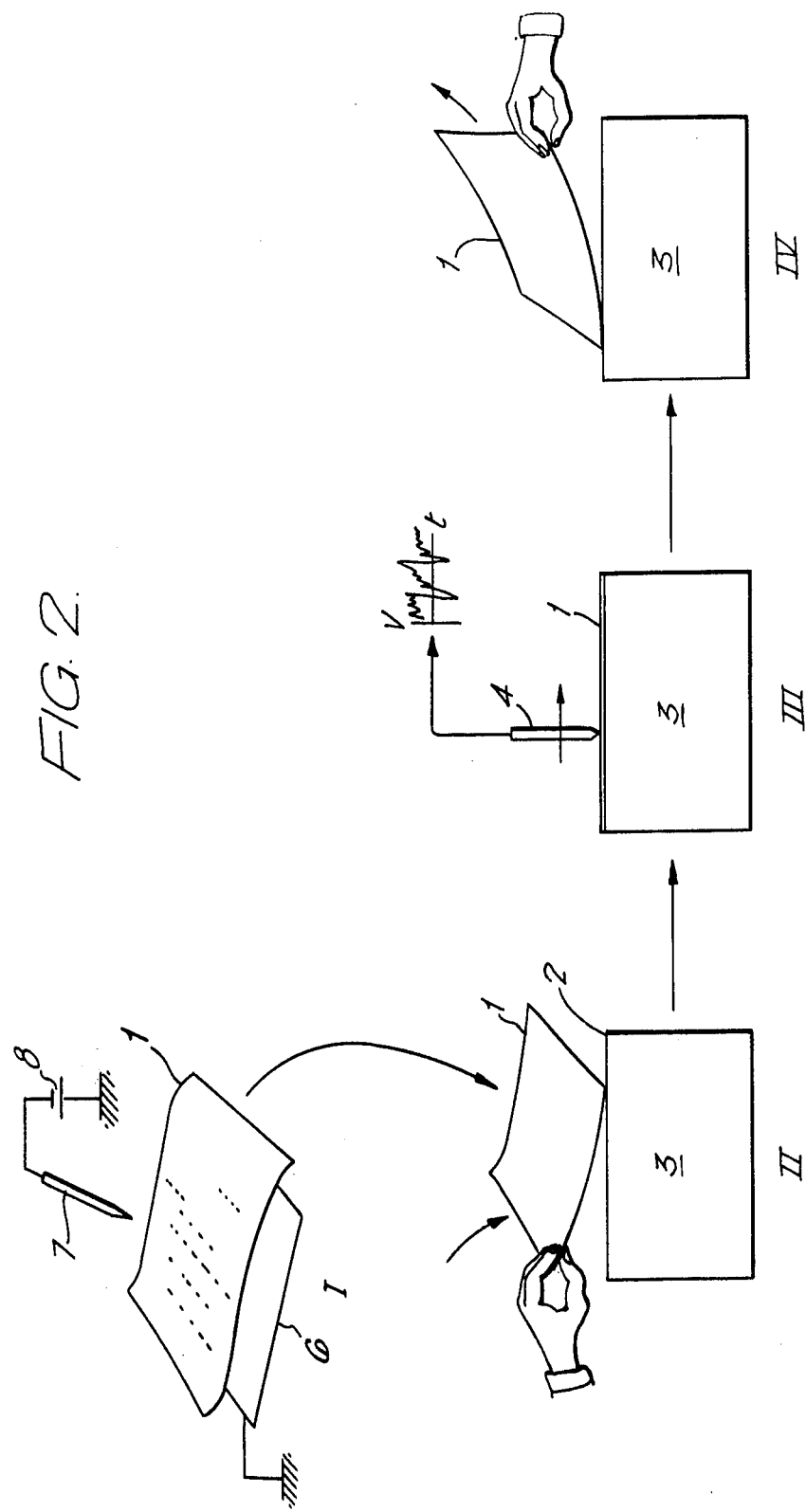
FIG. 2 is a schematic illustration of the system operating to transmit information from a visible image formed in an electrochromic material.

If desired, the image recorded on sheet 1 may be altered by the use of a hand held stylus, as indicated at I in FIG. 2. If the sheet 1 is placed on a suitable platen 6, for example a grounded conductive platen, then a stylus 7 connected to a battery or other potential source 8 may be used to write on the sheet 1 (or with polarity reversed to erase).

In order to transmit information from a pre-recorded electrochromic sheet 1, the sheet is placed on the platen 2 of the device 3, as indicated at II in FIG. 2, and a scanning movement is performed between the stylus array 4 and the sheet 1 as indicated at III in FIG. 2. The sheet 1 is, in effect, a thin electrochromic cell, which generates small e.m.f.'s across its thickness. Moreover the e.m.f. in the colored area is different, both in polarity and amplitude, to the e.m.f. in the unwritten areas. In the transmit mode depicted in FIG. 2, the styli can therefore be used to sense these small electrochemical e.m.f.'s during scanning, and thus directly generate an electrical signal from the image on the sheet for sending to a remote terminal. After transmission the sheet 1 can be removed, as indicated at IV in FIG. 2, and the image on the sheet can be read, temporarily stored, or copied as desired, or the sheet may be left on the platen for erasure or re-transmission.

Figure 3:
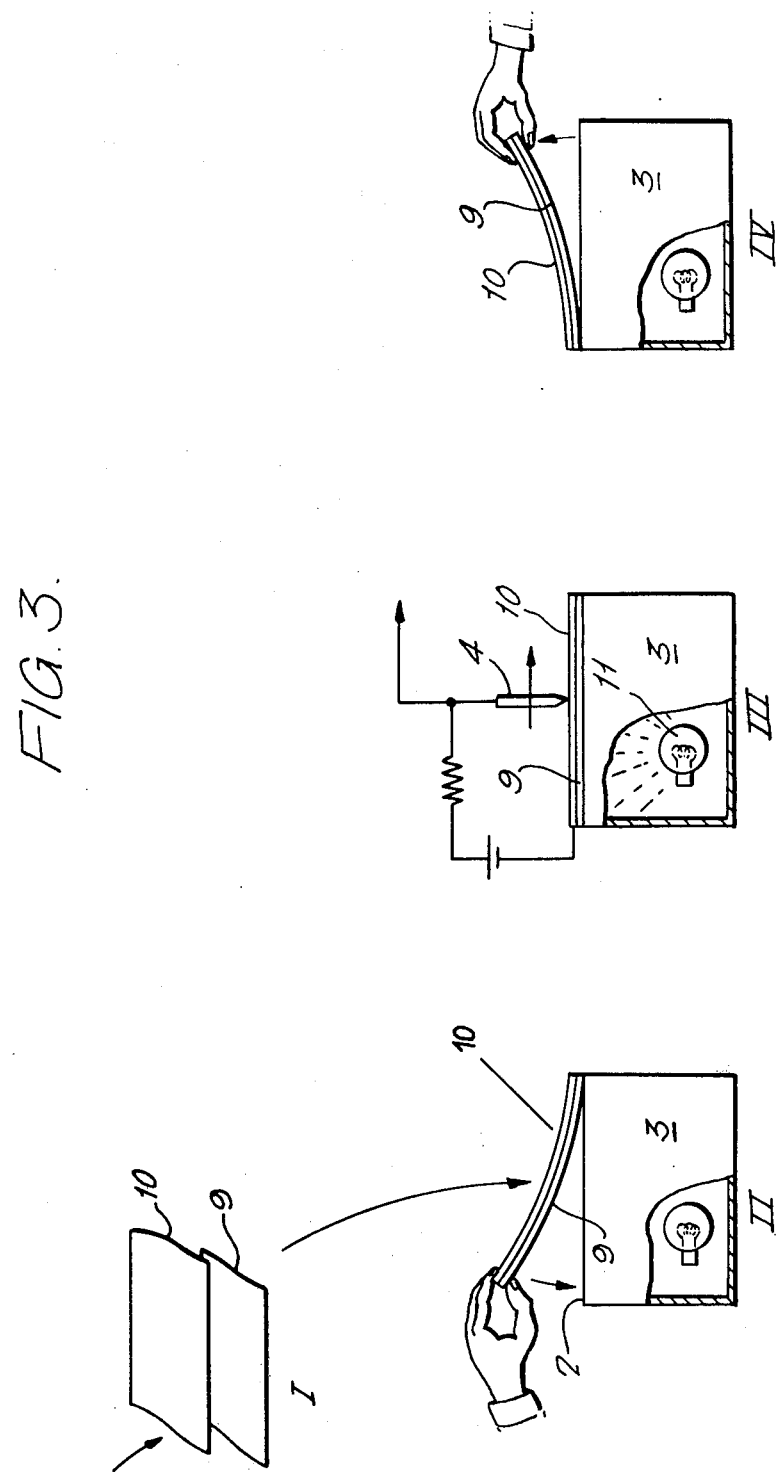
FIG. 3 is a schematic illustration of the system operating to transmit information from an original document.

If it is desired to transmit information from a normal (non-electrochromic) document, a simple modification to the system is all that is required, as will be described with reference to FIG. 3. As indicated at I in FIG. 3, an original document 9 is placed in contact with a sheet of a photoconductor 10. The document and the photoconductor sheet are placed on the platen 2 of device 3, as indicated at II in FIG. 3, with the photoconductor sheet uppermost. The document is illuminated by a lamp 11 during scanning, as indicated at III, and a d.c. voltage from source 12 is applied in series with the photoconductor sheet, the styli, and load resistors 13. The load resistors 13 may form an additional layer on the photoconductor sheet, which may be sensitized poly n-vinyl carbazole. The voltage variations detected by the styli in accordance with the photocurrents flowing in the photoconductor sheet are transmitted to a remote location. In this configuration, since the original document is used in a contact printing mode, the document must be a single-sided one.

The system of the invention has a number of advantageous features, in particular the ability to make use of semi-permanent visible images. Such images, on an electrochromic sheet, can be handled in the same way as permanent (or hard) copies, for long enough for many purposes, with the same advantages of portability and copiability, and with the added advantage that after use, the image can be erased for re-use of the sheet. The present system also has considerable advantages over other kinds of data-receiving displays, such as C.R.T.'s, which display only transient images, one at a time, at a fixed location, and which require special additonal facilities for making hard copies. The device 3 needed for the receipt and transmission of visible images is inherently simple, small, rugged, inexpensive, and transportable. It has no optics, and since the driving voltages required for the styli are low (of the order of 1 volt), leading to the possibility of large scale integration of the driver electronics, the system can be operated by dry batteries. As will have become apparent, the system saves paper, by utilizing a re-usable medium (which may be paper-like in appearance), and can be viewed by ambient light. A recorded sheet can be used to transmit its own copy, and information from original documents can be transmitted by a simple modification.

What is claimed is:

1. A transceiver system for graphical information comprising a recording sheet having at least a layer of an electrochromic material, a conductive support platen for said recording sheet, and a stylus array comprising a plurality of styli for scanning the sheet supported on the platen, the stylus array and the platen being mounted for relative movement, the system including receive means for selectively applying electrical potentials to individual ones of said styli during scanning so as to cause selective coloration of the electrochromic material in accordance with received electrical signals representing incoming graphical information, and transmit means, responsive to electrical potentials corresponding to outgoing graphical information and detected by individual ones of said styli, for transmitting electrical signals representing said outgoing graphical information.

2. The transceiver system of claim 1 wherein said outgoing graphical information is in the form of selective coloration in an electrochromic material in a recording sheet having at least a layer of the electrochromic material, the styli detecting potentials corresponding to the coloration.

3. The transceiver system of claim 1 wherein said outgoing graphical information is on a non-electrochromic material, the system including a photoconductor sheet between the outgoing graphical information and the styli, and the outgoing graphical information being illuminated, whereby the styli are responsive to photocurrents in the photoconductor sheet which correspond with the outgoing graphical information.

4. The transceiver system of claim 1 wherein said platen is a stationary platen, and said stylus array is mounted for scanning movement over said sheet.

* * * * *